United States Patent Office 3,495,537
Patented Feb. 17, 1970

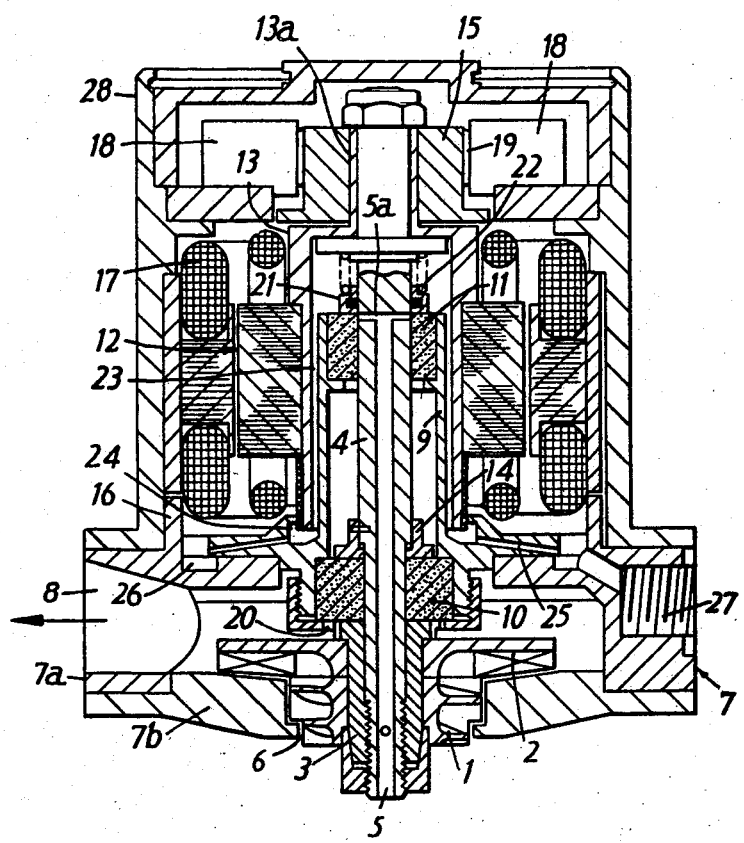

3,495,537
ELECTRIC MOTORS
Robert Archibald, Ilford, England, assignor to The Plessey Company Limited, Ilford, England, a British company
Filed May 2, 1968, Ser. No. 726,182
Claims priority, application Great Britain, May 4, 1967, 20,767/67
Int. Cl. F04d 13/02, 1/00
U.S. Cl. 103—87          4 Claims

ABSTRACT OF THE DISCLOSURE

To increase the life of a submerged motor-driven fuel-backing pump, its motor armature is mounted on a thimble member supported in cantilever fashion on the pump shaft to encircle a sleeve-like bearing housing upstanding from the pump housing and containing two axially spaced carbon bearings. Liquid from the pump delivery is arranged to rise through the two bearings in succession and return to the tank via cross bores and an axial bore of the pump shaft, and any liquid leaking past a seal at the upper face of the upper bearing is drained between the thimble and housing to a spill-drain connection.

---

This invention relates to electric motors and has for an object to provide improved mountings for the shaft of electric motors operating in inaccessible positions, more particularly for the shafts of fuel-backing pump-and-motor units for use in aircraft fuel tanks.

In modern aircraft it is common practice to mount in each fuel tank a so-called backing-pump unit, often incorporating a rotary pump and an electric motor, with the pump rotor coaxially connected for common rotation with the rotor of the electric motor. Such motor-and-pump units have hitherto been generally equipped with ball- or roller-type bearings for the rotor shaft. These bearings in most cases are the part of the unit which wears out quickest and thus cause the necessity of removing the pump from its relatively inaccessible position. The present invention has for a more specific object to provide an improved mounting system for the shaft of an electric motor, which permits the life of the bearings, and thus the time between removals of the unit, to be considerably extended while allowing the motor to run dry and at the same time permitting the axial length of the motor to be appreciably reduced.

While the bearing life could be increased by allowing the motor to run in a flooded condition and equipping it with bearings of fluid-pervious porous material which are lubricated and cooled by forcing through the bearings liquid tapped from the high-pressure side of the pump, this is generally undesirable from the point of view of drag and is particularly undesirable in the case of commutator motors where the presence of the liquid fuel is liable to interfere with good commutator contact and, as a consequence of this, often to reduce commutator life.

Bearing this in mind, it is another object of the invention to provide a combined electric-motor and pump unit which permits the use of bearings of fluid-pervious porous material which are lubricated and cooled by forcing through the bearing liquid tapped from the high-pressure side of the pump, while nevertheless preventing the entry of pressurized liquid from the bearings into the motor chamber in which the active elements of the motor are accommodated.

According to the present invention the rotor of the electric motor is mounted on a bell- or thimble-shaped rotor-carrier shaft secured to the outer end of a pump shaft which it concentrically surrounds, and which is mounted in carbon bearings or other suitable porous bearings arranged in a sleeve-like stationary bearing housing which concentrically extends into the bell-shaped rotor-carrier shaft from the open end thereof. The pump-and-motor unit is intended to be mounted with its shaft extending vertically and the bell open at its lower end, two axially spaced bearings being generally employed, and lubrication is effected by admitting fuel under pump-delivery pressure to the lower end of the lower bearing (referring to such disposition of the unit) causing it to pass through the latter and rise from there inside the sleeve-like bearing housing to enter the upper bearing, and the pump shaft has an axial bore which communicates with a transverse bore penetrating the pump shaft at the upper end of the upper bearing, so as to permit fuel which has passed through the two bearings to return to the tank through the said axial bore; any fuel passing through the upper surface of the upper bearing is disposed of by being allowed to flow down the outer surface of the sleeve-like bearing housing inside the bell-shaped rotor-carrier shaft to a collecting chamber at the lower end of the bell, which is drained as a safeguard against flooding of the motor.

The accompanying drawing is an axial section through one form of a motor-driven fuel-backing pump unit incorporating a preferred form of the invention.

Referring now to the drawing, the unit comprises a commutator-type electric motor in combination with a two-stage fuel-backing pump rotating with it about a common vertical axis. The backing pump comprises a helical-type first stage member 1 closely adjacent to a second stage impeller member 2, both members being mounted on a common boss 3, which in turn is secured on a pump shaft 4, which has axial bore 5 and is arranged to rotate with its helical pump member 1 operating in an inlet passage 6 at one end of a pump housing 7, from which fuel under backing pressure is delivered through an outlet 8. The pump is intended to be mounted in an aircraft fuel tank with the spindle 4 extending vertically and with the inlet aperture 6 arranged at the lower end of the spindle; for this reason terms like 'upper' and 'lower' when used in this specification are intended to be understood to apply to the pump when mounted in such position. A sleeve-like bearing housing 9, concentric with the shaft 4, is secured to the pump housing 7 to extend, coaxially with the inlet aperture 6, from the opposite end of the pump housing 7. Mounted in the sleeve-like housing 9 is a lower carbon bearing 10 and, axially spaced therefrom, an upper carbon bearing 11, both arranged to rotatably support the pump shaft 4. An electric-motor armature 12 is mounted on a bell- or thimble-shaped rotor shaft 13 which is open at its lower end. This rotor shaft has at its upper end a restricted neck portion 13a which is secured on the pump shaft 4 for common rotation therewith. In order to support the weight of the armature, the lower carbon bearing 10 is utilised as a combined journal and thrust bearing, a thrust ring 14 secured to the pump shaft 4 being provided to transfer the downward thrust force due to the weight of the armature assembly to the bearing 10. The armature 12 is equipped with a commutator 15, which is mounted on the outer side of the neck portion 13a of the bell-shaped rotor shaft 13. A fluid-tight motor casing 28 is fixed to the upper side of the pump housing 7, on which it is centered by a collar 16 of the latter. This casing serves to support a wound stator 17 and a pair of mountings 18 for brushes 19 co-operating with the commutator 15. An annular gap 20 at the lower end of the bearing housing 9 admits fuel from the pressure outlet 8 of the pump to the lower face of the lower bearing 10, causing fuel to rise through the porous body of the bearing in order to lubricate and cool its working surface, and to rise further past the thrust collar 14 through the interior of the bearing housing 9 to the lower face of the upper bearing 11, lubricating and cooling the latter, and finally to return, from an area near the upper end of this bearing 11, through a transverse bore 5a and the axial bore 5 of the pump shaft 4 into the fuel tank near the pump inlet 6. A sealing ring 21 is applied by a spring 22 to the upper face of the upper bearing 11 to force the rising liquid to enter the transverse bore 5a of the pump shaft 4 and prevent it from rising through the upper end face of the bearing 11 into the upper part of the cavity of the bell-shaped rotor carrier sleeve 13.

In order to drain away any liquid which may have escaped past the seal, an annular gap 23 is left between the outer surface of the housing sleeve 9 and the inner surface of the bell-shaped rotor-carrier sleeve 13, and this gap is arranged to lead to an annular collector groove 24, from where the liquid is conducted by bores 25 to a further collector groove 26 which communicates to a drain connection 27 in the pump housing 7, whence it is conducted by suitable piping through the wall of the tank and the skin of the aircraft for final disposal.

The pump housing 7 comprise a main body 7a and a cover plate 7b. Removal of the latter gives access to the helix and impeller members 1 and 2 of the pump, and the whole armature assembly can be withdrawn from the motor housing 15 jointly with the pump housing 7.

It will be appreciated that the construction described permits in a submerged pump assembly the employment of carbon or other porous bearings which are lubricated and cooled by the operating liquid of the pump, while at the same time ensuring dry running of the motor, and that, since both bearings 10 and 11 can be arranged within the axial length occupied by the motor armature and pump, the invention permits the construction of a motor-and-pump unit having a very small overall axial length.

What I claim is:

1. A combined electric-motor and pump unit, which comprises a housing body having a pumping chamber and a motor chamber arranged above said pumping chamber and separated therefrom by a horizontal partition, a pump rotor mounted in the pumping chamber and secured for joint rotation on a vertical shaft which projects from the pumping chambers into the motor housing through an aperture in said partition, a support sleeve extending from said partition into said motor housing, said sleeve being so arranged as to encircle said aperture and coaxially encircle said shaft in radially spaced relation for at least part of the projecting length of the shaft, bearings of fluid-pervious, porous material secured in said sleeve to rotatably support said shaft, a bell-shaped rotor carrier accommodated in said motor chamber and coaxially secured to said shaft above said bearings to coaxially encircle said sleeve in radially spaced relation thereto, a motor rotor also accommodated in said motor chamber and secured on the outer side of said bell-shaped carrier for point rotation therewith, and a motor stator mounted in the housing for electromagnetic co-operation with said motor rotor.

2. A motor and fuel pump unit as claimed in claim 1, which includes an upper porous bearing and a lower porous bearing and lubrication means for the porous bearings which direct fuel under pump-delivery pressure to the lower end of the lower bearing to pass through the latter and rise from there inside the sleeve-like bearing housing to enter the upper bearing.

3. A unit as claimed in claim 2, wherein the pump shaft has an axial bore which communicates with a transverse bore penetrating the pump shaft at the upper end of the upper bearing, so as to permit fuel which has passed through the two bearings to be drained through the said axial bore.

4. A unit as claimed in claim 3, wherein a drained collecting chamber is formed in the housing at the lower end of the bell to permit any fuel passing through the upper surface of the upper bearing to be disposed of by being allowed to flow down the outer surface of the sleeve-like bearing housing inside the bell-shaped rotor-carrier shaft to said drained collecting chamber.

References Cited

UNITED STATES PATENTS

| | | | |
|---|---|---|---|
| 1,964,415 | 6/1934 | Van Deventer | 230—139 |
| 2,107,481 | 2/1938 | Johnson | 103—87 XR |
| 3,017,072 | 1/1962 | Hagg et al. | |
| 3,261,295 | 7/1966 | White | 103—87 |

ROBERT M. WALKER, Primary Examiner

U.S. Cl. X.R.

103—103